United States Patent [19]

Vobeck

[11] Patent Number: 5,393,107
[45] Date of Patent: Feb. 28, 1995

[54] PLUG-IN SPIGOT-AND-SOCKET JOINT

[75] Inventor: Manfred Vobeck, Laufach, Germany

[73] Assignee: Eisenwerke Fried Wilh. Düker GmbH & Co., Karlstadt, Germany

[21] Appl. No.: 188,423

[22] Filed: Jan. 24, 1994

[30] Foreign Application Priority Data

Jan. 27, 1993 [DE] Germany ............... 4302215.4

[51] Int. Cl.6 ............................................. F16L 21/06
[52] U.S. Cl. .................................... 285/322; 285/374
[58] Field of Search ..................... 285/322, 323, 374

[56] References Cited

U.S. PATENT DOCUMENTS

| | | | |
|---|---|---|---|
| 4,805,932 | 2/1989 | Imhof et al. | 285/322 X |
| 5,100,183 | 3/1992 | Montesi et al. | 285/323 X |
| 5,297,824 | 3/1994 | Imhof et al. | 285/322 |

FOREIGN PATENT DOCUMENTS

| | | | |
|---|---|---|---|
| 2-253079 | 10/1990 | Japan | 285/322 |
| 3-84293 | 4/1991 | Japan | 285/322 |

*Primary Examiner*—Dave W. Arola
*Attorney, Agent, or Firm*—Jacobson, Price, Holman & Stern

[57] ABSTRACT

The spigot-and-socket joint which is secured against sliding is designated to connect the spigot end (3) of a pipe which can be slid into the socket end (2) of another pipe, with radial play existing. In the socket end there are arranged a sealing ring (8) and a separate clamping ring (14) comprising a plurality of circumferentially extending, spaced clamping segments (15) having a spherically convex outer surface (17) and, on an inner surface, a tooth system (19) which, in the presence of axial forces, presses radially onto the spigot end (3) as the spherically convex surface (17) cooperates with a pipe socket's inner surface (18) which tapers conically towards the end. An elastomeric support member (20), which can be fixed in its position at the socket front end and supports the same, is provided on the clamping ring (14). A configuration, which ensures proper retention is obtained when a steel ring (28), which increases the flexural strength of the connecting portion (24), is associated with the support member's thicker annular disk-shaped portion (23), which bears on the socket front face (22), with the portion (24) connecting with the clamping ring (14) issuing from the support member. Particularly in the case of increased rated widths, the clamping ring (14) is conveniently provided with a circumferential recess for accommodating a non-flexing support ring (31) which is preferably made from steel.

7 Claims, 1 Drawing Sheet

PLUG-IN SPIGOT-AND-SOCKET JOINT

BACKGROUND OF THE INVENTION

The present invention relates to a plug-in spigot-and-socket joint. More specifically the present invention relates to a plug-in spigot-and-socket joint which is secured against sliding, in particular, for molded components and for socket pipes manufactured by centrifugal casting techniques.

In patent application number P 41 34 089.2-12, which discloses a similar type of spigot-and-socket joint, stability problems exist especially in the case of large sized socket pipes and correspondingly large clamping rings. The clamping rings lose their circular shape and may collapse while the pipes are being handled. This creates difficulties when inserting the clamping ring into the locking chamber, which makes mounting the spigot and socket joint substantially more difficult when the spigot end of one pipe is inserted into the socket end of another pipe.

SUMMARY OF THE INVENTION

According to the present invention a plug-in spigot-and-socket joint is provided which is secured against sliding and in which the spigot end of one pipe is adapted to be slid, with radial play, into the socket end of another pipe having a sealing ring and a clamping ring arranged in the socket end, said clamping ring comprising of a plurality of clamping segments spaced in the circumferential direction, the clamping segments having a convex outer surface are joined in the circumferential direction by a vulcanization-bonded intermediate layer of rubber or the like and have on their inner surface a tooth system radially pressing against the spigot end by the convex outer surface cooperating with a distally conically tapering inner surface of the socket pipe when axial forces are present, wherein an elastomeric support member adapted to be affixed to a front face of said socket and supporting the same is moulded onto said clamping ring, said support member comprising an annular disk portion bearing on the front face of said socket and an approximately conically connecting portion extending from an inner edge of the front face of said socket up to the clamping ring, the connecting portion being adapted to be widened together with the clamping ring dependent upon the outer dimensions of said spigot end to be introduced and to be stretched in the axial direction on this occasion, the connecting portion extends from the annular disk portion which bears against the front face of said socket and has increased flexural strength by virtue of a thickened structure, and wherein the inner edge of the front face of said socket has a recessed region matching the cross section of the thickened annular disk portion.

The present invention envisages a spigot and socket joint which is secured against sliding so that a secure position is ensured before, and particularly during insertion of the spigot end of the pipe into the socket when a support member of the clamping ring with its clamping segments is fixed at the inner face of the socket.

The spigot-and-socket joint according to the present invention, which is secured against sliding and in which the abovementioned problem is solved whereby a clamping ring with clamping segments and a vulcanization-bonded intermediate layer connecting the latter in the circumferential direction, are provided with a circumferetial recess to accommodate a support ring of increased flexural strength on a rear side away from the disk portion.

With this form of clamping ring one can positively fix the clamping ring inside the pipes before and while they are plugged into each other and even when the socket pipes have rated widths of "NW" of 600 to 1000 and more. The risk of unintentional detachment and collapse of the rings at the front face of the socket is practically eliminated. In this way dependable insertion of the spigot end of one pipe into the socket end of another pipe is ensured even during assembly.

The support ring can be bonded by vulcanization in the circumferential recess, i.e. together with the clamping ring it can form a unit. However with regard to manufacture it proved to be particularly advantageous to fix, in the cicrcumferential recess, an elastomeric holding ring to hold the inserted support ring.

It is envisaged that the support ring would be made of a particularly resistant and non-flexible synthetic material. It is preferred and proved to be particularly advantageous to make the support ring of steel.

Particularly easy handling is obtained when the circumferential recess of the clamping ring is in the axial direction toward the side farthest from the annular disk portion and when the holding ring fixed in the circumferential recess is provided with an axial insertion gap for the support ring. By virtue of the insertion gap, the holding ring can be inserted into the clamping ring prior to assembly and can be removed again. The width of the insertion gap is conveniently smaller than the diameter of the holding ring.

DETAILED DESCRIPTION OF THE DRAWINGS

Figure 1:
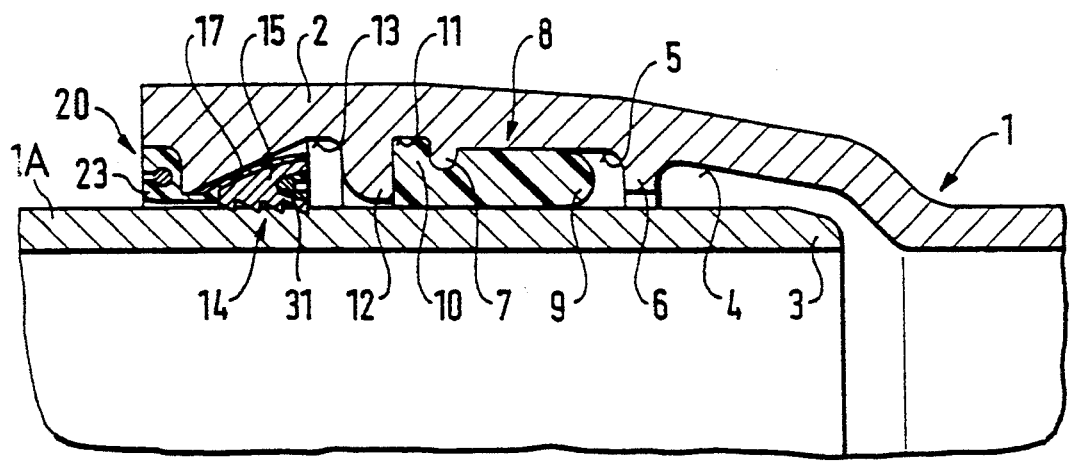
FIG. 1, is a cross section of the spigot end of a pipe with applied socket end of the adjoining pipe.
Figure 2:
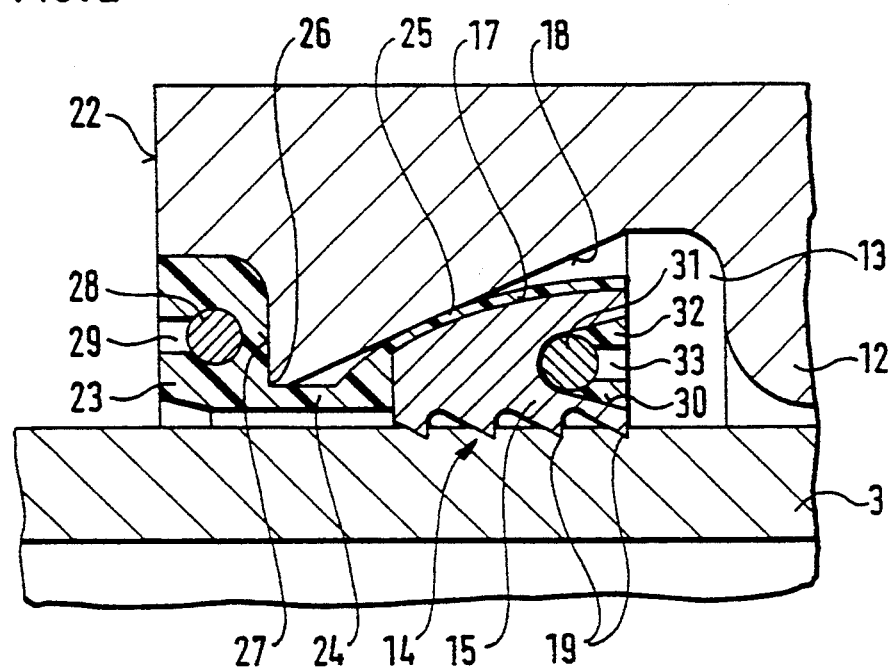
FIG. 2, is an enlarged portion of FIG. 1.

FIGS. 1 and 2 show the preferred socket joint arrangement of the present invention whereby a socket pipe 1 which has at its end, the socket end 2, a socket into which a spigot end 3 of an adjoining socket pipe 1a can be inserted with radial play. In the interior of the socket there is provided a recess 4 which facilitates relative tilting of the socket pipe 1 within specific limits. Following this recess there is formed a sealing chamber 5, one end of which is bounded by a radially extending internal shoulder 6 of the socket end 2. An annular bead 7 is spaced from the internal shoulder 6 within the sealing chamber 5. This bead 7 serves to fix the position of a sealing ring 8 which comprises a head portion 9 of a softer elastomeric material and a foot portion of a harder elastomeric material. This foot portion 10 is situated within an annular groove 11 which is bounded by the annular bead 7 on the one hand and a support shoulder 12 on the other, with the shoulder 12 delimiting the other end of the sealing chamber 5. In this way the position of the sealing ring 8 is fixed and is kept in the position shown even when the spigot end 3 is introduced into the socket end 2 under deformation of the head 9. Between the support shoulder 12 and the front face 22 of the socket end 2 there is a locking chamber 13 which serves to accommodate a clamping ring 14. The clamping ring 14 is composed of a plurality of circumferentially extending spaced clamping segments 15. In the circumferential direction the clamping segments 15 are interconnected by an intermediate vulcanization-bounded layer, preferably of rubber or the like, and is not shown in FIGS. 1 and 2. On the side facing the locking chamber 13, each of the clamping segments 15 has a spherically convex outer surface 17. The surface 17 cooperates with the inner surface 18 of the socket end 2 and conically tapers toward the end, i.e. in the presence of axial forces it is pressed radially onto the spigot end 3 by means of the tooth system 19 provided on the clamping segments 15 inner surface.

As shown in the drawings, onto the clamping ring 14 there is applied an elastomeric support member 20 which is adapted to be attached to the front face 22 of the socket end 2 and supports the same. The support member 20 can comprise a ring-cylindrical portion contacting the outside of the socket end 2 and optionally, an adjacent annular disk-shaped portion 23 contacting the front face 22. In the embodiment illustrated there is provided a connecting portion 24 which extends from the inner edge of the front face 22 to the clamping ring 14, tapers approximately conically in the unstressed state, issues from the annular disk-shaped portion 23, which is particularly thick and has increased flexural strength. Depending upon the outer dimensions of the spigot end 3 to be inserted, the connecting portion 24 is adapted to be widened together with the clamping ring 14 and is expansible in the axial direction so that it finally assumes the widened shape shown in FIGS. 1 and 2.

It also follows from FIGS. 1 and 2 that on the spherically convex outer surface 17 of the clamping ring 14 which faces the conically tapering inner surface 18 of the socket end 2, the connecting portion 24 of the support member 20 is provided with an insulating coating 25 which serves to insulate electrically the joined pipes from each other. This coating 25 can be formed by an enamel layer or a fibre-glass-reinforced plastic material layer.

As seen in FIGS. 1 and 2 the front face 22 has on the side of its inner edge a recess region 27 which is complimentary to the cross section of the reinforced annular disk-shaped portion 23. This is helped in that the support member 20 of the clamping ring 14, with its clamping segments 15, bears against the inner surface 18 of the socket end 2 both before and during the insertion of the spigot end 3 of the pipe 1a into the socket end 2, particularly in the case where the spigot-and-socket joints are of large rated widths. This is provided for by the increased flexural strength resulting from the portion 23 being reinforced and of approximately rectangular cross section. The recess region 27 of the front face 22 is formed by a step 26 on the side of the inner edge.

Especially in the case of a support member/clamping ring unit for socket pipes of large rated widths, it is advantageous to provide a ring 28 preferably of steel which increases the flexural strength, for the reinforced annular disk-shaped portion 23 of the support member 20. In the portion 23 there is provided an axial insertion slit 29 through which the ring 28 can be inserted and, if necessary, removed. The retention effect is enhanced when the width of the insertion slit 29 chosen is smaller in diameter than the steel ring 28.

With reference to FIG. 2 the preferred embodiment of the invention is shown where, on the rear side away from the annular disk-shaped portion 23, the clamping ring 14 with the clamping segments 15 and intermediate layer, which connects the segments in the circumferential direction and is bonded by vulcanization, is provided with a circumferential recess 30 which serves to accommodate a non-flexing support ring 31 made preferably of steel. For this purpose a holding ring 32, which is made from an elastomeric material and fixes the support ring 31, is mounted inside the circumferential recess 30. The circumferential recess 30 of the clamping ring 14 is open in the axial direction away from the annular disk-shaped portion 23 and flares in this direction. The holding ring 32, which is mounted in the recess 30, is provided with an axial insertion gap 33 for the support ring 31. The width of the insertion gap 33 is smaller than the diameter of the support ring 31.

I claim:

1. A plug-in spigot-and-socket joint which is secured against sliding, for molded components and for socket pipes produced by the centrifugal casting techniques, in which the spigot end of one pipe is slid, with radial play, into the socket end of another pipe having a sealing ring and a separate clamping ring arranged in the socket end, said clamping ring comprising a plurality of clamping segments spaced in the circumferential direction, having a convex outer surface, are joined in the circumferential direction by a vulcanization bonded intermediate layer and have on an inner surface a tooth system radially pressing against the spigot end as the convex surface cooperates with a distally conically tapering inner surface of said socket pipe when axial forces are present, wherein an elastomeric support member is applied to a front face of said socket and to said clamping ring, said support member comprising an annular disc-shaped portion bearing against the front face of said socket and an approximately conically tapering connecting portion extending from an inner edge of the front face of said socket to said clamping ring, with the connecting portion being widened together with said clamping ring dependent upon outer dimensions of said spigot end introduced and to be stretched in an axial direction on this occasion, wherein the annular disc-shaped portion which bears against the front face of said socket has increased thickness and flexural strength relative to the remaining portions of said elastomeric support member and wherein the inner edge of the front face of said socket is provided with a recessed region matching a cross section of the annular disc-shaped portion, and whereby said clamping ring with the clamping segments and with the vulcanization-bonded intermediate layer connecting the latter in the circumferential direction is provided with a circumferential recess to accommodating a support ring of increased flexural strength relative to said elastomeric support member on a rear side away from the annular disc-shaped portion.

2. The plug-in spigot-and-socket joint of claim 1 wherein the vulcanization-bonded intermediate layer is a layer of rubber.

3. The plug-in spigot-and-socket joint of claim 1 further comprising a holding ring of an elastomeric material mounted within the circumferential recess of the clamping ring and retains the support ring which is accommodated therein.

4. The plug-in spigot-and-socket joint of claim 3 wherein the circumferential recess of the clamping ring is in the axial direction open away from the annular disc-shaped portion and the holding ring is provided with a an axial insertion gap for insertion of the support ring.

5. The plug-in spigot-and-socket joint of claim 4 wherein the insertion gap's width is smaller than the support ring's diameter.

6. The plug-in spigot-and socket joint of claim 1 in which the support ring is made of steel.

7. The plug-in spigot-and-socket joint of claim 1, wherein the annular disc-shaped portion is reinforced.

* * * * *